(12) United States Patent
Kobayashi et al.

(10) Patent No.: US 8,804,020 B2
(45) Date of Patent: Aug. 12, 2014

(54) PHOTOELECTRIC CONVERSION APPARATUS AND IMAGE PICKUP SYSTEM

(75) Inventors: Daisuke Kobayashi, Hatogaya (JP); Yoshikazu Yamazaki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 13/215,519

(22) Filed: Aug. 23, 2011

(65) Prior Publication Data
US 2012/0050560 A1 Mar. 1, 2012

(30) Foreign Application Priority Data
Aug. 27, 2010 (JP) .................................. 2010-191318

(51) Int. Cl.
*H04N 5/335* (2011.01)

(52) U.S. Cl.
USPC .......................................................... 348/308

(58) Field of Classification Search
USPC .................. 348/294, 296, 302, 308, 321, 323
See application file for complete search history.

(56) References Cited

U.S. PATENT DOCUMENTS

| | | | | | |
|---|---|---|---|---|---|
| 6,005,237 | A | * | 12/1999 | Matsunaga | 250/208.1 |
| 7,136,097 | B1 | * | 11/2006 | Toyoda et al. | 348/222.1 |
| 8,054,353 | B2 | * | 11/2011 | Tanifuji | 348/294 |
| 2004/0135910 | A1 | * | 7/2004 | Nam | 348/308 |
| 2008/0239124 | A1 | * | 10/2008 | Mori et al. | 348/308 |
| 2010/0097507 | A1 | * | 4/2010 | Krymski | 348/300 |

FOREIGN PATENT DOCUMENTS

| | | |
|---|---|---|
| CN | 101485194 A | 7/2009 |
| CN | 101753864 A | 6/2010 |
| EP | 1729503 A2 | 12/2006 |
| EP | 1980208 A1 | 10/2008 |
| EP | 2037673 A1 | 3/2009 |
| EP | 2200270 A2 | 6/2010 |
| JP | 08-111821 A | 4/1996 |
| JP | 11-164211 A | 6/1999 |
| JP | 2002-171386 A | 6/2002 |
| JP | 2008-103992 A | 5/2008 |
| JP | 2008-283331 A | 11/2008 |
| JP | 2009-267969 A | 11/2009 |

* cited by examiner

*Primary Examiner* — Timothy J Henn
(74) *Attorney, Agent, or Firm* — Canon USA, Inc. IP Division

(57) ABSTRACT

A photoelectric conversion apparatus includes signal processing units that are provided in correspondence with columns of a pixel array and that have at least a plurality of analog-to-digital converters that convert signals output from pixels into digital signals, an output unit configured to have two or more output terminals and include a plurality of output blocks provided in correspondence with the output terminals, and a synchronizing signal generating unit configured to output a synchronizing signal. Signal processing units in a plurality of columns that are adjacent to one another or in every other column are arranged as a block. The plurality of output blocks output signals output from a plurality of signal processing units that belong to the block. A synchronizing code adding unit configured to synchronize with the synchronizing signal and add synchronizing codes to the signals output from the plurality of output blocks is further included.

11 Claims, 13 Drawing Sheets

PHOTOELECTRIC CONVERSION APPARATUS AND IMAGE PICKUP SYSTEM

BACKGROUND OF THE INVENTION

1. Field of the Invention

The present invention relates to a photoelectric conversion apparatus, and more particularly to a photoelectric conversion apparatus that outputs digital signals.

2. Description of the Related Art

Photoelectric conversion apparatuses used in digital cameras and the like are required to have various functions.

In Japanese Patent Laid-Open No. 08-111821, a configuration is disclosed in which a pixel portion is divided into a plurality of regions using a plurality of columns adjacent to one another as a unit and each region has an output port.

However, in the case of the configuration disclosed in Japanese Patent Laid-Open No. 08-111821, analog signals are transmitted to each output port, and a case where digital signals are output is not taken into consideration.

SUMMARY OF THE INVENTION

A photoelectric conversion apparatus that will be disclosed hereinafter includes a pixel array in which a plurality of pixels are arranged in rows and columns, signal processing units that are provided in correspondence with the columns of the pixel array and that are configured to have at least a plurality of analog-to-digital converters that convert signals output from the pixels into digital signals, an output unit configured to have two or more output terminals and include a plurality of output blocks provided in correspondence with the output terminals, and a synchronizing signal generating unit configured to output a synchronizing signal. Signal processing units in a plurality of columns that are adjacent to one another or in every other column are arranged as a block. The plurality of output blocks output signals output from a plurality of signal processing units that belong to the same block. A synchronizing code adding unit configured to synchronize with the synchronizing signal and add synchronizing codes to the signals output from the plurality of output blocks is further included.

Further features of the present invention will become apparent from the following description of exemplary embodiments with reference to the attached drawings.

DESCRIPTION OF THE EMBODIMENTS

First Embodiment

Embodiments will be described with reference to the drawings.

Figure 1:
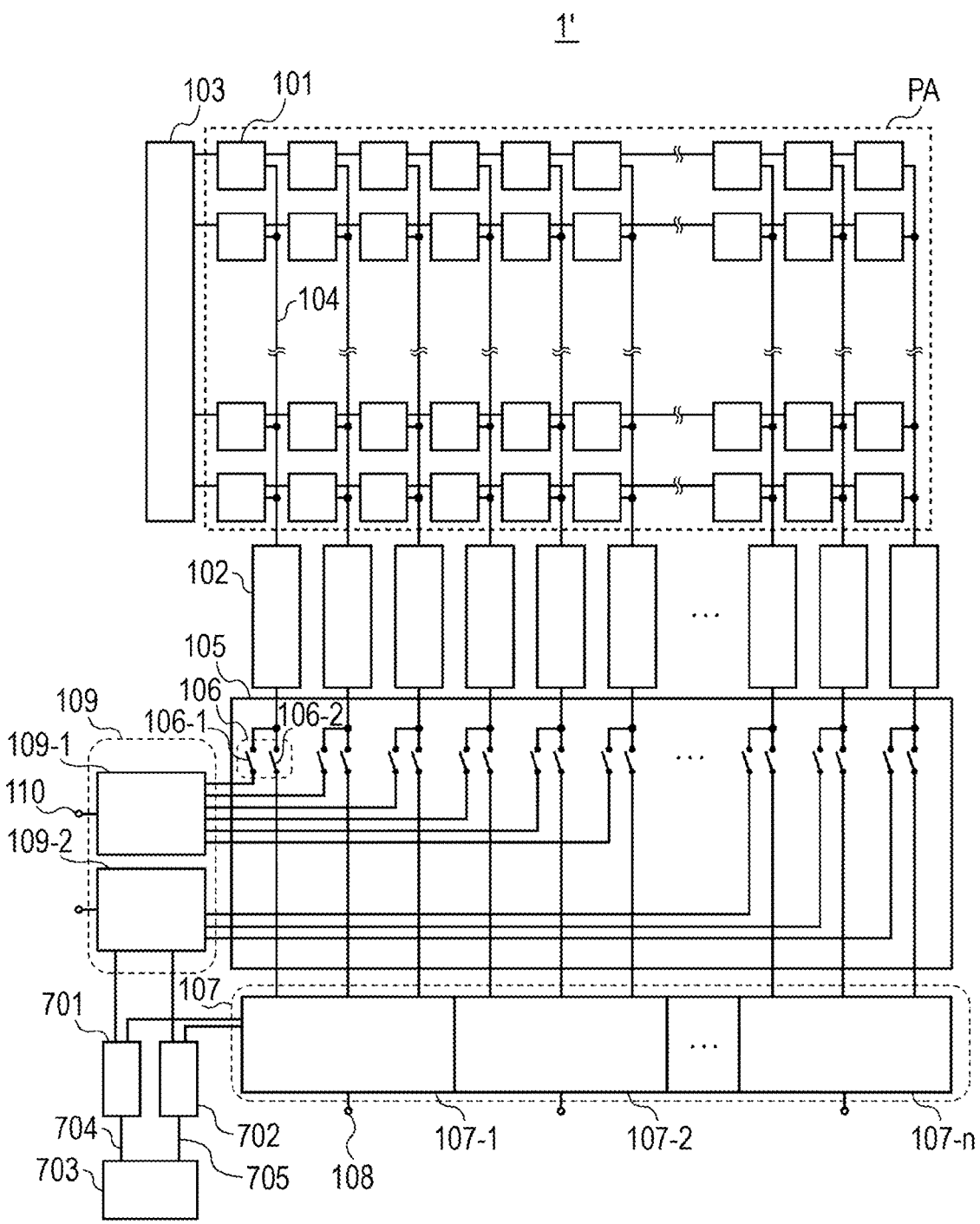
FIG. 1 is a block diagram illustrating an exemplary configuration of a photoelectric conversion apparatus according to a first embodiment of the present invention.

FIG. 1 is a block diagram illustrating an exemplary configuration of an image pickup apparatus according to this embodiment, which is, for example, formed on the same semiconductor substrate.

A photoelectric conversion apparatus 1 includes a pixel array PA in which pixels 101 are arranged in rows and columns. Here, N rows and M columns of the pixels 101 are provided. Pixels 101 in the same column of the pixel array PA are connected to a signal processing unit 102 through a common signal line 104. Signal processing units 102 each have at least an analog-to-digital converter and output a digital signal. A row selection unit 103 supplies a signal for selecting a row of pixels 101 that outputs signals to signal lines 104, and the row of pixels 101 simultaneously outputs the signals to the corresponding signal lines 104. An output selection unit 105 includes switching units 106 and transmits, to a first output unit 107 or a second output unit 109, the digital signals output from the signal processing units 102. The switching units 106 are controlled by signals input from a control unit, which is not illustrated. The first output unit 107 includes a plurality of first output blocks, each of which is associated with signal processing units 102 in three adjacent columns. Digital signals input from the signal processing units 102 are sequentially output from first output terminals 108. The second output unit 109 includes a plurality of second output blocks, each of which is associated with signal processing units 102 in six adjacent columns. Digital signals input from the signal processing units 102 are sequentially output from second output terminals 110. That is, with a plurality of signal processing units 102 considered as a block, the first output unit 107 outputs, from two or more output terminals 108, signals input from signal processing units 102 that belong to the same block, and the second output unit 109 outputs, from one or more output terminals 110, signals input from signal processing units 102 that belong to different blocks. To generalize the relationship between the first output unit 107 and the second output unit 109, the first output unit 107 outputs signals from M/S output terminals 108, with S (S≥2) signal processing units 102 arranged as a block. On the other hand, the second output unit 109 outputs signals from M/T output terminals 110, with T (T>2) signal processing units 102 arranged as a block, where T is larger than S. FIG. 1 illustrates a case in which S=3 and T=M/2.

The elements that configure the photoelectric conversion apparatus 1 will be described in detail. The pixels 101 perform photoelectric conversion on incident light and output electrical signals corresponding to the amount of incident light. The pixels 101 may be amplifying type pixels that incorporate amplifying elements such as source follower circuits or may be passive type pixels that output electric charge generated by the photoelectric conversion.

The signal processing units 102 may further include, in addition to the analog-to-digital converters, correlated double sampling (CDS) circuits as noise reduction circuits for reducing noise components included in signals output from the pixels 101. By performing analog-to-digital conversion on signals in which noise has been reduced, accuracy can be increased. In addition, the signal processing units 102 may further include memory units that temporarily hold digital data obtained from the analog-to-digital converters. Each memory unit may be configured by, for example, a static random-access memory (SRAM). In FIG. 1, the output of each signal processing unit 102 is indicated by a single line for the simplicity of the diagram, but n-bit digital data is output in parallel in the actual configuration.

The output selection unit 105 selectively transmits digital signals output from the signal processing units 102 to the first output unit 107 or the second output unit 109. In FIG. 1, the output selection unit 105 has switches 106-1 and 106-2 for each signal processing unit 102. A digital signal is transmitted to the first output unit 107 or the second output unit 109 by closing either the switch 106-2 or the switch 106-1, respectively.

First output blocks 107-1, 107-2, and so on of the first output unit 107 have parallel-to-serial converters (hereinafter referred to as P/S converters). The first output blocks 107-1, 107-2, and so on convert n-bit parallel data input through the output selection unit 105 into serial data and output the serial data from the first output terminals 108. The first output terminals 108 may use a method in which a single terminal performs voltage output or may use a low-voltage differential signaling (LVDS) method in which two differential terminals are used. In addition, in order to select a signal to be transmitted to each first output terminal 108 from signals transmitted in parallel from three columns of signal processing units 102, the first output unit 107 has column selection units. As the column selection units, decoders and shift registers may be used. Thus, high-speed transmission can be realized by outputting parallel data from the signal processing units 102, and an increase in the number of output terminals can be suppressed by converting the parallel data into serial data in the first output unit 107. Since a photoelectric conversion apparatus formed on a semiconductor substrate needs to be small in area, it is effective to suppress an increase in the number of output terminals.

When signals are to be output from the first output unit 107, a number of signals corresponding to the number of output blocks can be output in parallel to one another. That is, with the configuration illustrated in FIG. 1 taken as an example, signals transmitted from signal processing units 102 in first columns, which each are one of three signal processing units 102 that have been associated with each output block, are simultaneously output from corresponding first output terminals 108. The n-th column here is counted from the leftmost column of the pixel array PA. Signals in the output blocks transmitted from signal processing units 102 in second columns of each output block are then simultaneously output from the corresponding first output terminals 108. In short, as to the entire pixel array PA, signals from signal processing units 102 in second, fifth, and eighth columns and so on are output after signals from signal processing units 102 in first, fourth, and seventh columns and so on are output. As a result, signals are output in a discontinuous manner. In other words, signals from non-adjacent columns are output. Therefore, in a processing circuit, which is not illustrated, a process for rearranging the order of signals is performed.

Output blocks 109-1, 109-2, and so on of the second output unit 109 have, as in the case of the first output unit 107, P/S converters and may have a configuration in which n-bit parallel data input through the output selection unit 105 is converted into serial data and then output from the second output terminals 110. In addition, the second output unit 109 has, as with the first output unit 107, column selection units in order to select a signal to be transmitted to each second output terminal 110 from signals transmitted in parallel from six columns of signal processing units 102. As the column selection units, decoders and shift registers may be used.

When signals are to be output from the second output unit 109, since signals transmitted from signal processing units 102 in second and ((M/2)+2)th columns are output after signals transmitted from signal processing units 102 in first and ((M/2)+1)th columns are output, a process for rearranging the order of signals is performed by the processing circuit, which is not illustrated.

The photoelectric conversion apparatus 1 can operate in a first mode, in which signals are output from the first output terminals 108, or in a second mode, in which signals are output from the second output terminals 110, switching between the first mode and the second mode. In both modes, reduction of power consumption is achieved by stopping the supply of power to an output unit that does not output signals or by stopping the operation of part of the circuit, or both.

Whereas signals are simultaneously output from M/T output terminals 110 in the second mode, signals are simultaneously output from M/S output terminals 108 (S<T) in the first mode, which makes it possible to read the signals at higher speed. The first mode is effective when, for example, high reading speed is required, as in the case of shooting a movie. However, since a larger number of output blocks operate in the first mode, power consumption is larger. On the other hand, in the second mode, since a smaller number of output blocks operate than in the first mode, power consumption can be reduced although the reading speed is lower. The second mode is effective when, for example, high reading speed is not required, as in the case of capturing a still image.

A digital signal processing unit capable of executing addition, subtraction, gain adjustment, and the like may be provided between the output selection unit 105 and each output unit. For example, sensitivity can be increased by adding signals transmitted from a plurality of signal processing units 102 and treating the resultant signal as a single signal. In addition, by performing bit shift on digital data, gain can be applied digitally. The photoelectric conversion apparatus 1 can reduce load on the processing circuit in the subsequent stage by incorporating these functions thereinto. The processing circuit in the subsequent stage may be formed, for example, on a semiconductor substrate different from that on which the photoelectric conversion apparatus 1 is formed.

As described in this embodiment, by configuring the photoelectric conversion apparatus 1 such that signals can be output from either the first output unit 107 or the second output unit 109, an increase in power consumption can be suppressed, while realizing high-speed reading.

A point that is characteristic in the present invention is that a synchronizing signal generating unit 701 and a synchronizing code adding unit 702 are included.

The synchronizing signal generating unit 701 includes, for example, a phase-locked loop (PLL) circuit. A cyclic signal to be supplied to the PLL circuit may be generated by an oscillator by providing the oscillator inside the photoelectric conversion apparatus 1 or may be provided from outside the photoelectric conversion apparatus 1. The PLL circuit may include a multiplier that multiplies an input cyclic signal, thereby changing the frequency of a synchronizing signal. The PLL circuit may cause synchronizing signals supplied to the first output unit 107 and the second output unit 109 to have different frequencies.

The synchronizing code adding unit 702 adds, to a head of a digital signal output from each output block, a synchronizing code that is in synchronization with a synchronizing signal output from the synchronizing signal generating unit 701. The synchronizing code is used to recognize the head of each piece of data. More specifically, the synchronizing code adding unit 702 outputs a synchronizing code at a predetermined timing before the output selection unit 105 begins to transmit a digital signal to each output block. The predetermined timing may be, for example, a timing set through communication with an external device, which is not illustrated, or may be a timing stored in a memory device, which is not illustrated, in advance.

The amount of data to be read from each row is different depending on the reading mode, such as a case in which all the pixels 101 in the pixel array PA are read, a case in which pixels 101 in a particular region is read, or a case in which a reduced number of pixels are read. Therefore, by adding a synchronizing code for each reading operation in the horizontal direction, that is, for each row, beginnings of rows can be easily identified by the processing circuit in the subsequent stage and therefore errors that may occur at sampling of data can be reduced.

A drive signal generating unit 703 supplies the synchronizing signal generating unit 701 with a synchronizing signal output control signal 704 and the synchronizing code adding unit 702 with a synchronizing code addition control signal 705, in order to control the operation timing and the timing at which a synchronizing code is added.

Figure 2:
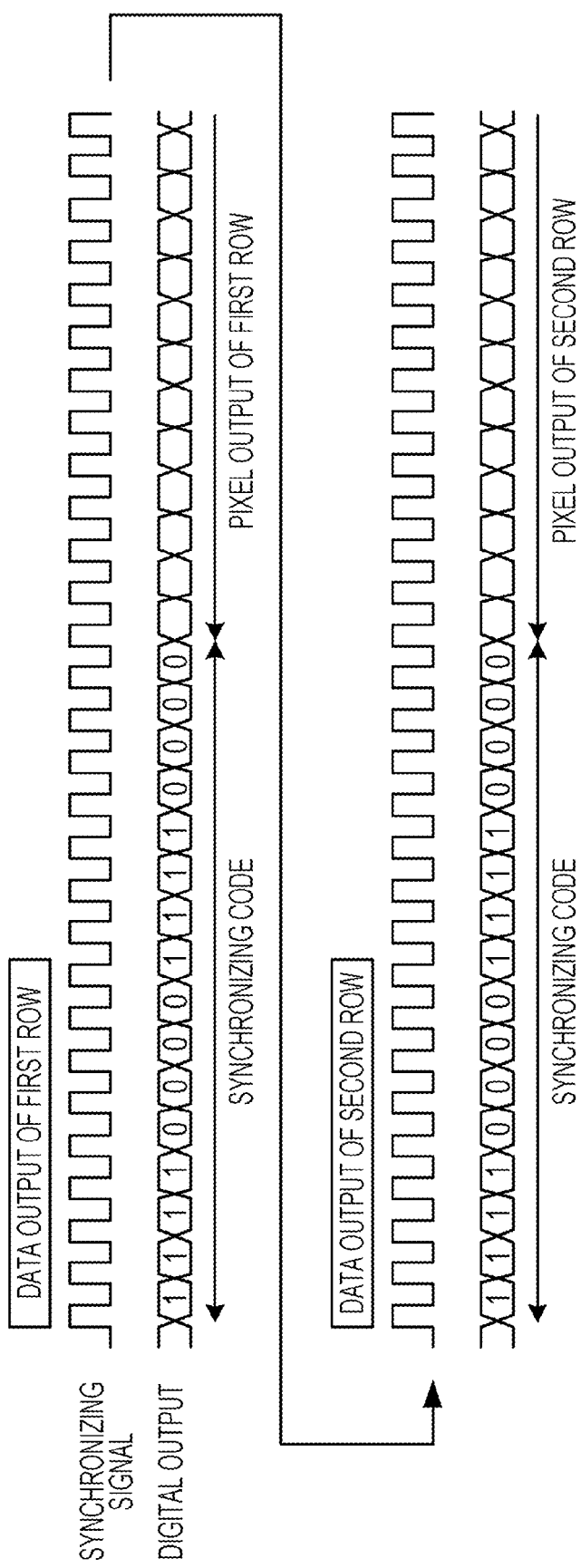
FIG. 2 is a timing chart illustrating the state of output signals according to the first embodiment.

FIG. 2 is a timing chart illustrating the state of a synchronizing signal and synchronizing codes at a time when digital signals are output from the first output unit 107 or the second output unit 109. In FIG. 2, "synchronizing signal" indicates a synchronizing signal output from the synchronizing signal generating unit 701 and "digital output" indicates digital signals output from the first output terminals 108 or the second output terminals 110.

In synchronization with turning of the synchronizing signal to a high level, the digital signals are output from the first output terminals 108 or the second output terminals 110 bit by bit. Prior to pixel output (digital signals supplied from the signal processing units 102) of a first row, a synchronizing code is output from the first output terminals 108 or the second output terminals 110. When the pixel output of the first row is completed, the synchronizing code is output from the first output terminals 108 or the second output terminals 110 again prior to pixel output of a second row. Here, 16-bit data "1111000011110000" is added as the synchronizing code. By receiving this synchronizing code, the processing circuit in the subsequent stage can identify the beginning of data transfer of a certain row, thereby reducing errors that may occur when the data is obtained. In particular, by adding the synchronizing code to the output of each output block, even if an error is caused between the output blocks with respect to the timing at which a signal is output, heads of data can be identified.

Although the synchronizing signal generating unit 701 and the synchronizing code adding unit 702 are provided in common for both the first output unit 107 and the second output unit 109 in the example described above, synchronizing signal generating units and synchronizing code adding units may be separately provided for the first output unit 107 and the second output unit 109.

Second Embodiment

Figure 3:
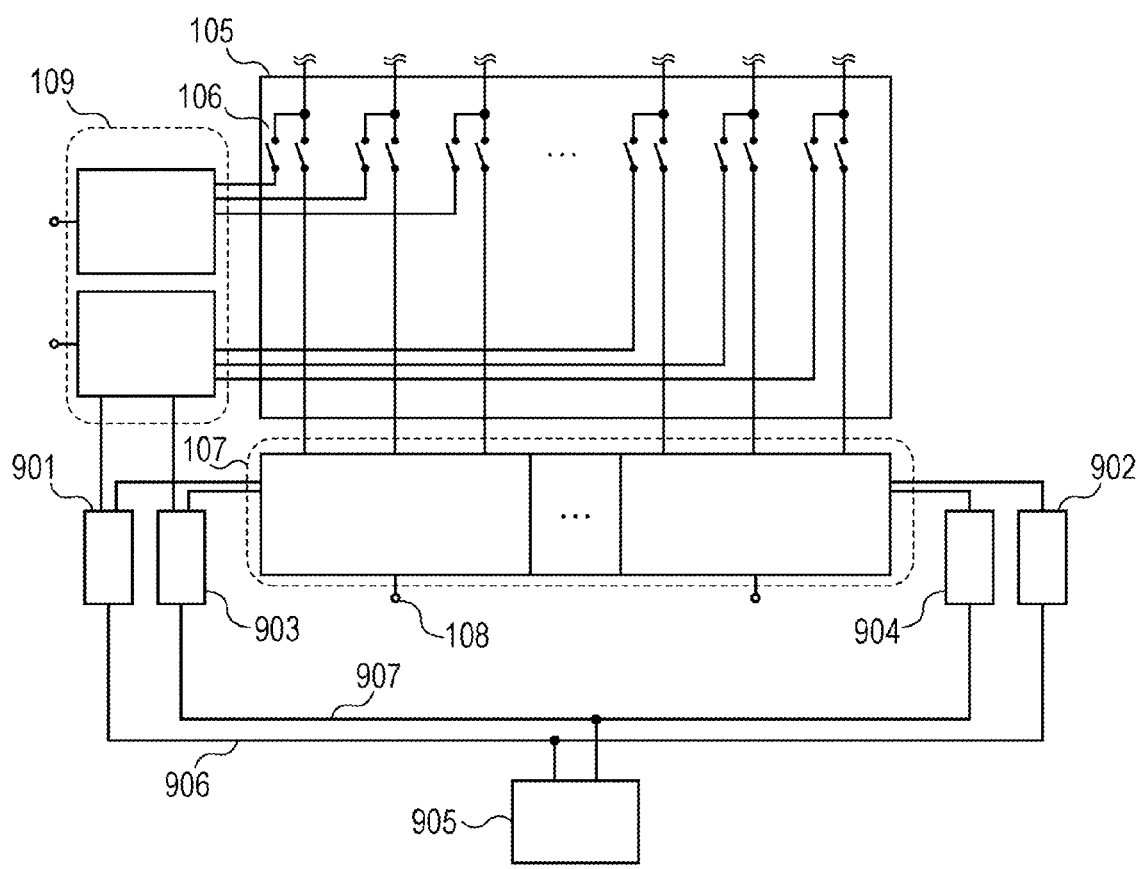
FIG. 3 is a block diagram illustrating an exemplary configuration of a photoelectric conversion apparatus according to a second embodiment.

FIG. 3 is a block diagram illustrating an example of a configuration according to another embodiment. Here, the configuration of the output selection unit 105 and the subsequent components are illustrated.

In the first embodiment, the synchronizing signal generating unit 701 and the synchronizing code adding unit 702 are provided on one side of the first output unit 107; however, in this configuration, all the output blocks of the first output unit 107 are driven with common wiring, which may cause delay of signals especially when the number of columns of the pixel array PA is large. On the other hand, in the configuration illustrated in FIG. 3, synchronizing signal generating units 901 and 902 and synchronizing code adding units 903 and 904 are provided on both sides of the first output unit 107 in order to improve driving abilities for driving the wiring, thereby reducing the delay.

The synchronizing signal generating units 901 and 902 and the synchronizing code adding units 903 and 904 are controlled by a drive signal generating unit 905. In order to maintain the synchronicity of operation between the synchronizing signal generating units 901 and 902 and between the synchronizing code adding units 903 and 904, which are provided away from each other, the synchronizing signal generating units 901 and 902 and the synchronizing code adding units 903 and 904 are connected to the drive signal generating unit 905 by lines having the same lengths. That is, delay of signals is equalized between the synchronizing signal generating units 901 and 902 and between the synchronizing code adding units 903 and 904.

Although a configuration in which the two synchronizing signal generating units 901 and 902 and the two synchronizing code adding units 903 and 904 are provided is illustrated in FIG. 3, three or more synchronizing signal generating units and synchronizing code adding units may be provided.

According to this embodiment described above, by adding synchronizing codes, heads of data can be identified and an adverse effect due to wiring delay between the output blocks can be reduced. More specifically, it is possible to reduce an adverse effect due to errors in the output blocks upon obtaining data and unintended variation between rows in the timing at which data is obtained, which are caused by wiring delay of a synchronizing signal and synchronizing codes supplied to each output block.

Third Embodiment

Figure 4:
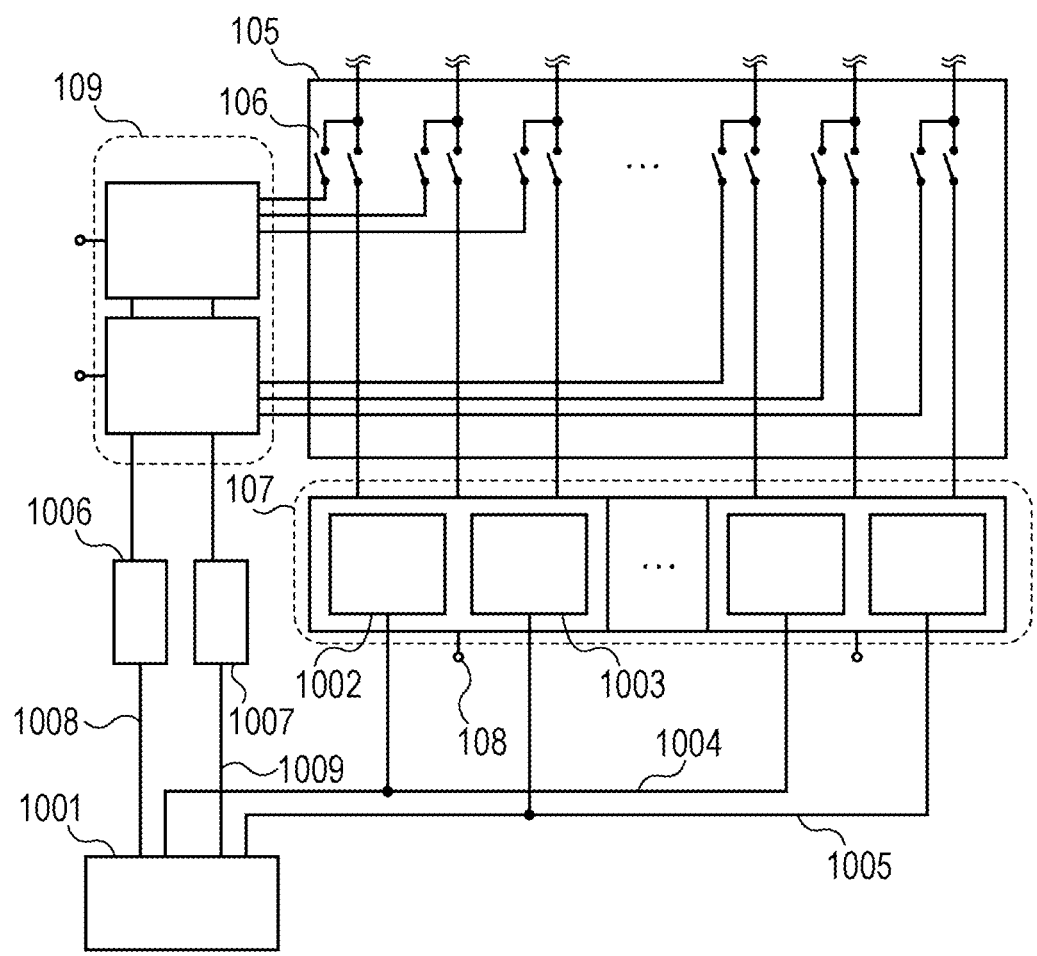
FIG. 4 is a block diagram illustrating an exemplary configuration of a photoelectric conversion apparatus according to a third embodiment.

FIG. 4 is a block diagram illustrating an example of a configuration according to another embodiment. Here, the configuration of the output selection unit 105 and the subsequent components is illustrated.

In this embodiment, a synchronizing signal generating unit 1002 and a synchronizing code adding unit 1003 are included in each output block of the first output unit 107. For the output blocks of the second output unit 109, a synchronizing signal generating unit 1006 and a synchronizing code adding unit 1007 that are used in common are provided. The synchronizing signal generating unit 1002 and the synchronizing code adding unit 1003 provided in each output block of the first output unit 107, the synchronizing signal generating unit 1006 and the synchronizing code adding unit 1007 are controlled by a common drive signal generating unit 1001.

In this embodiment, too, a synchronizing code is added to a head of each row of pixel output (digital signals supplied from the signal processing units 102) as in the first embodiment.

Figure 5:
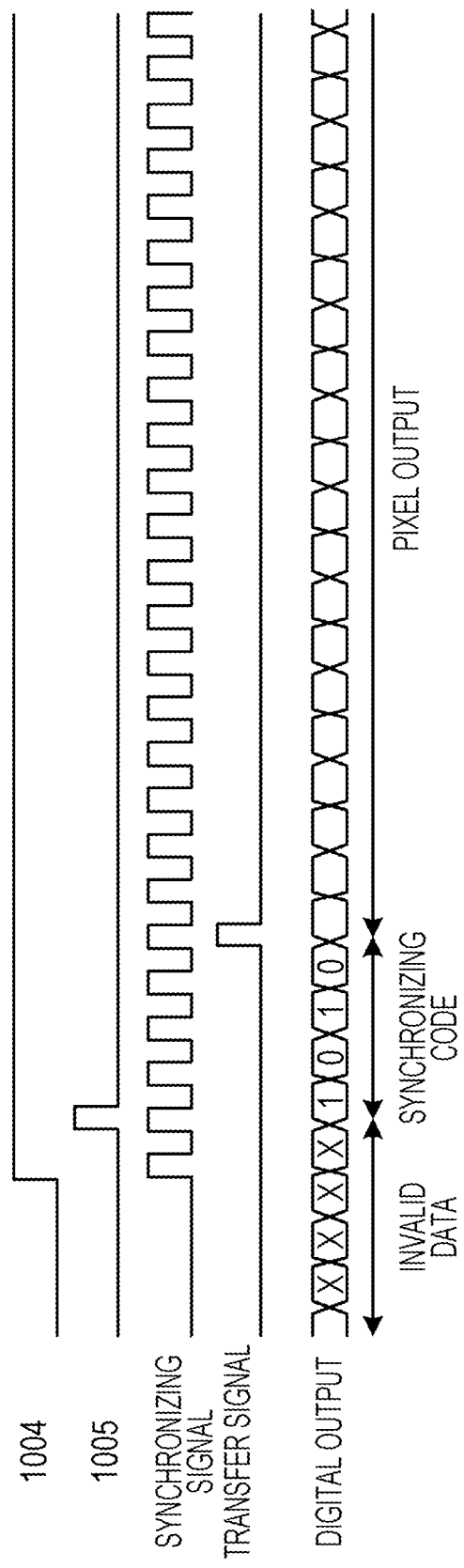
FIG. 5 is a timing chart illustrating the state of output signals according to the third embodiment.

FIG. 5 is a timing chart illustrating the relationship between a pixel output of a certain row and a synchronizing signal. A synchronizing signal output control signal 1004 and a synchronizing code addition control signal 1005 illustrated in FIG. 5 are output from the drive signal generating unit 1001. "Synchronizing signal" indicates a synchronizing signal generated by the synchronizing signal generating unit 1002, and "transfer signal" indicates a signal for causing the switching units 106 in the output selection unit 105 to transmit digital signals output from the signal processing units 102 to the first output unit 107. In addition, "digital output" indicates signals output from the first output terminals 108.

In FIG. 5, the synchronizing signal is output when the synchronizing signal output control signal 1004 turns to a high level. After that, in synchronization with a pulse of the second period after the beginning of generation of the synchronizing signal, the synchronizing code addition control signal 1005 turns to a high level and accordingly a synchronizing code is output. Here, "1010" is added as the synchronizing code. The transfer signal turns to a high level in synchronization with turning of the synchronizing signal to a high level immediately after a last bit of the synchronizing code is output. Thus, digital signals output from the signal processing units 102 are converted into serial data and sequentially output.

Figure 6:
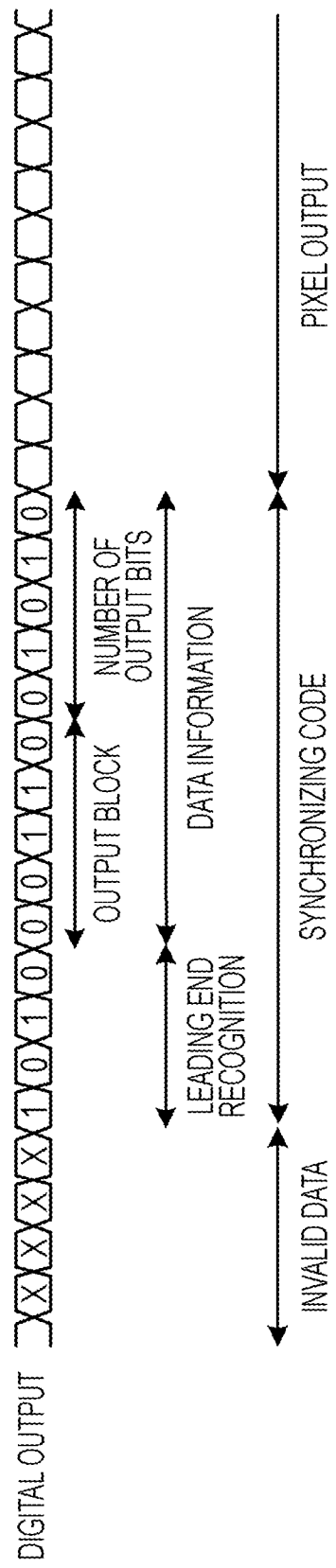
FIG. 6 is another timing chart illustrating the state of the output signals according to the third embodiment.

In addition, a synchronizing code may not only indicate a head of a row, but also add another piece of information. FIG. 6 illustrates an example in which, in addition to information regarding a head of a row, information regarding the position of an output block and information regarding the number of bits of pixel output are added as a synchronizing code. A code "1010" for identifying a head of a row is added as first 4 bits of the synchronizing code, and then a code "00110" for identifying the output block is added. Finally, a code "01010" for indicating the number of bits of pixel output is added.

In the configuration according to this embodiment, since the phase relationship is complete within each output block, the phase control between the output blocks may be omitted, thereby reducing load on the processing circuit in the subsequent stage.

Fourth Embodiment

Another embodiment will be described with reference to the drawings.

This embodiment will be described while the configuration of an output selection unit is focused upon. In the configuration illustrated in FIG. 1, when signals are to be output from the second output unit 109, the signal processing units 102 provided for respective columns drive corresponding signal lines 104 to transmit the signals to the second output unit 109.

However, whereas signal lines 104 driven by signal processing units 102 located close to the second output unit 109 have shorter lengths, signal lines 104 driven by signal processing units 102 located far from the second output unit 109 have longer lengths. Therefore, the transmission speed of signals output from the signal processing units 102 located far from the second output unit 109 may be undesirably lower.

Figure 7:
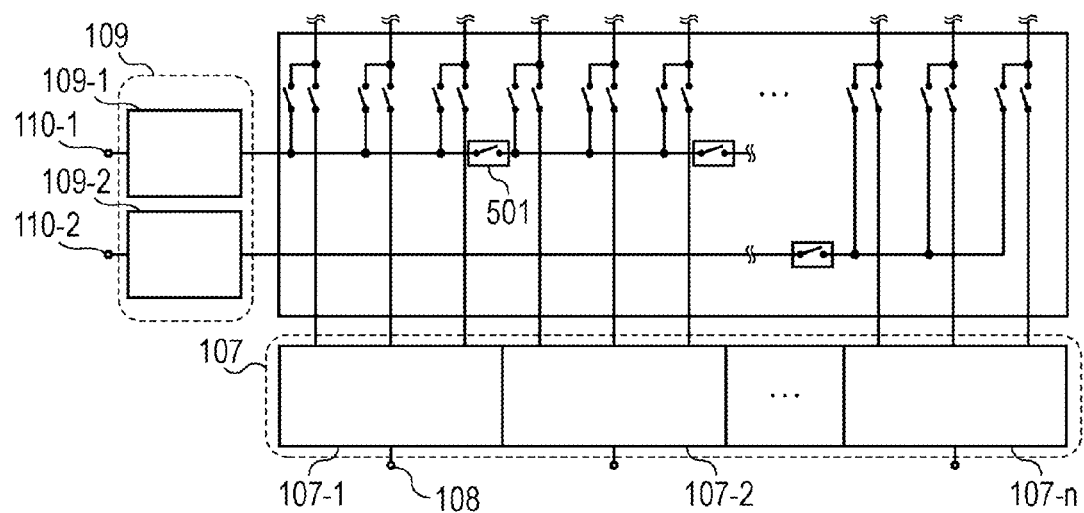
FIG. 7 is a diagram illustrating an exemplary configuration of a photoelectric conversion apparatus according to a fourth embodiment.

In this embodiment, signal processing units 102 that output signals from the same output block of the second output unit 109 are configured to be connected to the second output unit 109 through a common transmission line. As illustrated in FIG. 7, a plurality of columns are arranged as a block and blocks are connected by connection units 501, which separate transmission lines of unnecessary part. With such a configuration, it is possible to reduce load on the signal processing units 102 for driving lines, thereby suppressing reduction in the transmission speed.

The connection units 501 may be configured to include buffers, instead of being configured as switches as illustrated in FIG. 7. When the connection units 501 include buffers, the continuity of signals between the blocks can be maintained by configuring each buffer to have a synchronizing function and transmit a signal to a next buffer in synchronization with clock signals, which are not illustrated.

Figure 8:
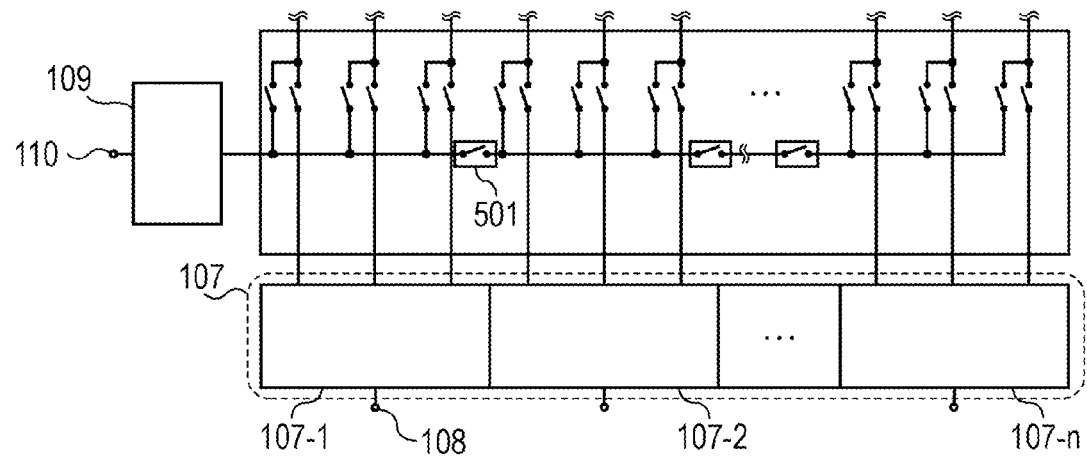
FIG. 8 is a diagram illustrating another exemplary configuration of the photoelectric conversion apparatus according to the fourth embodiment.

Another exemplary configuration is illustrated in FIG. 8. In this configuration, a single transmission line is used for the entirety of the pixel array PA and the blocks are connected by buffers. Therefore, reduction in the transmission speed of signals can be suppressed. In addition, since only one output block is used in the second output unit 109, power consumption in the second mode can be further reduced.

In particular, when only a single transmission line is used, since the second output terminal 110 outputs signals sequentially from a signal transmitted from the first column, the processing circuit in the subsequent stage need not rearrange the order of the signals.

Fifth Embodiment

Another embodiment will be described with reference to the drawings.

Figure 9:
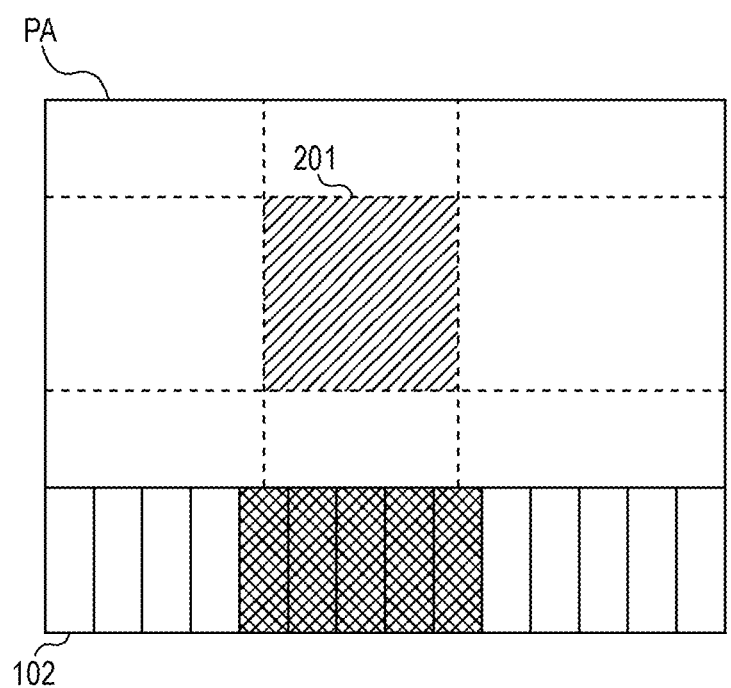
FIG. 9 is a diagram for explaining the state of an image pickup surface according to a fifth embodiment.

A photoelectric conversion apparatus is sometimes required to operate in a partial reading mode, in which a part of an imaging area is read out. FIG. 9 is a diagram schematically illustrating the pixel array PA, which is the imaging area, and the signal processing units 102. A case in which a region 201 illustrated in FIG. 9 is cut out and read will be described.

When only the region 201 is to be read, it is sufficient if only signal processing units 102 in columns corresponding to this region operate. Therefore, by setting a power-saving state, such as by stopping the supply of power to signal processing units 102 in columns that are not involved in the reading operation, power consumption of the photoelectric conversion apparatus 1 can be reduced. As a specific example, it is possible to shut current that drives a comparator of an analog-to-digital converter. A power-saving mechanism may be incorporated into each signal processing unit 102 or may be provided for each block illustrated in FIG. 1. If a power-saving mechanism is provided for each block, signal processing units 102 in columns that do not need to read signals might undesirably operate, but reduction in power consumption can be realized with a simpler configuration than when a power-saving mechanism is provided for each column.

Furthermore, by setting output blocks that are not involved in the reading operation to the power-saving state, further reduction in power consumption can be realized.

According to this embodiment described above, high-speed reading can be realized, while suppressing an increase in power consumption.

Sixth Embodiment

Yet another embodiment will be described with reference to the drawings.

Figure 10:
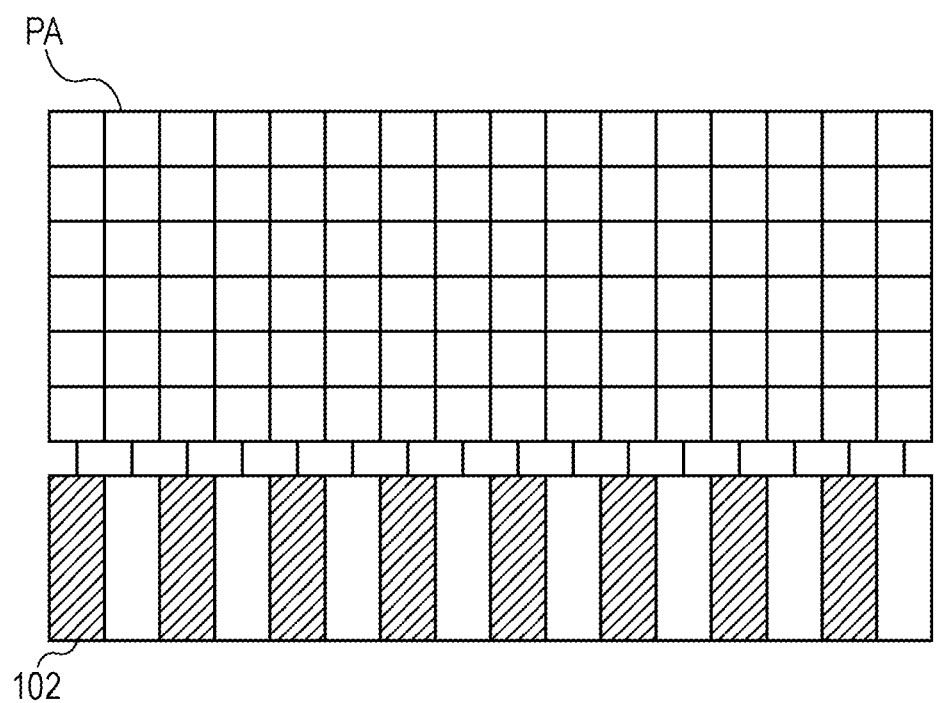
FIG. 10 is a diagram illustrating the state of operation of a photoelectric conversion apparatus according to a sixth embodiment.

A photoelectric conversion apparatus is sometimes required to operate in a reduced reading mode, in which signals are read from pixels whose intervals have been increased on the imaging area. FIG. 10 is a diagram schematically illustrating the pixel array PA and the signal processing units 102 at a time when signals are read from pixels in every other column. Assume that signals are read from pixels in columns corresponding to hatched signal processing units 102.

In this embodiment, too, by setting only signal processing units 102 in columns in which signals are to be read to the operation state, and by setting signal processing units 102 in the other columns to the power-saving state, power consumption can be reduced.

Signals output from the signal processing units 102 may be output from either first output unit 107 or the second output unit 109. The output unit to be used may be selected in accordance with the usage.

In order to simplify description, a case in which signals are read from all the pixels in columns on which the reading operation is performed has been described. However, the row selection unit 103 may be driven such that, for example, signals are read from pixels in every other row.

Seventh Embodiment

Yet another embodiment according to the present invention will be described with reference to the drawings.

Figure 11:
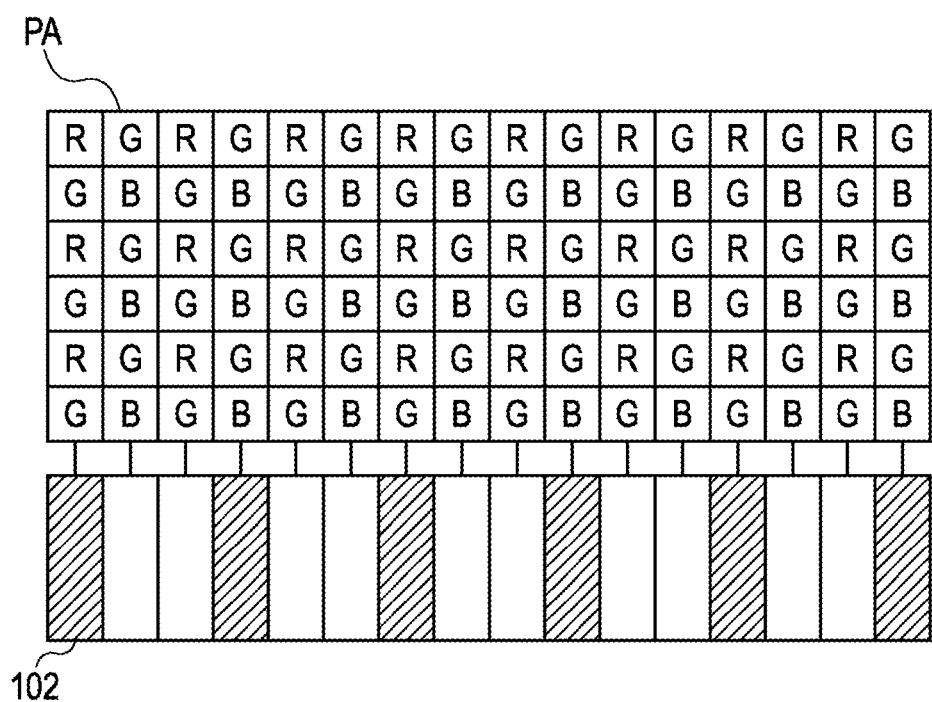
FIG. 11 is a diagram illustrating the state of operation of a photoelectric conversion apparatus according to a seventh embodiment.

Here, a photoelectric conversion apparatus provided with color filters corresponding to the pixels 101 will be considered. As illustrated in FIG. 11, when a Bayer pattern in which pixel rows having red (R) pixels and green (G) pixels that are disposed alternately and pixel rows having green (G) pixels and blue (B) pixels that are disposed alternately are arranged alternately is used, if signals are read from pixels in every other column or row, there is a color for which signals are not obtained. Therefore, as illustrated in FIG. 11, signals may be read from selected pixels in every three columns or rows. In doing so, signals can be obtained for all the colors.

In this embodiment, as with the sixth embodiment, by setting signal processing units 102 in columns in which signals are to be read to the operation state and by setting signal processing units 102 in the other columns to the power-saving state, power consumption can be reduced. In addition, signals output from the signal processing units 102 may be output from either the first output unit 107 or the second output unit 109. The output unit to be used may be selected in accordance with the usage.

Eighth Embodiment

Yet another embodiment will be described with reference to the drawings.

Figure 12:
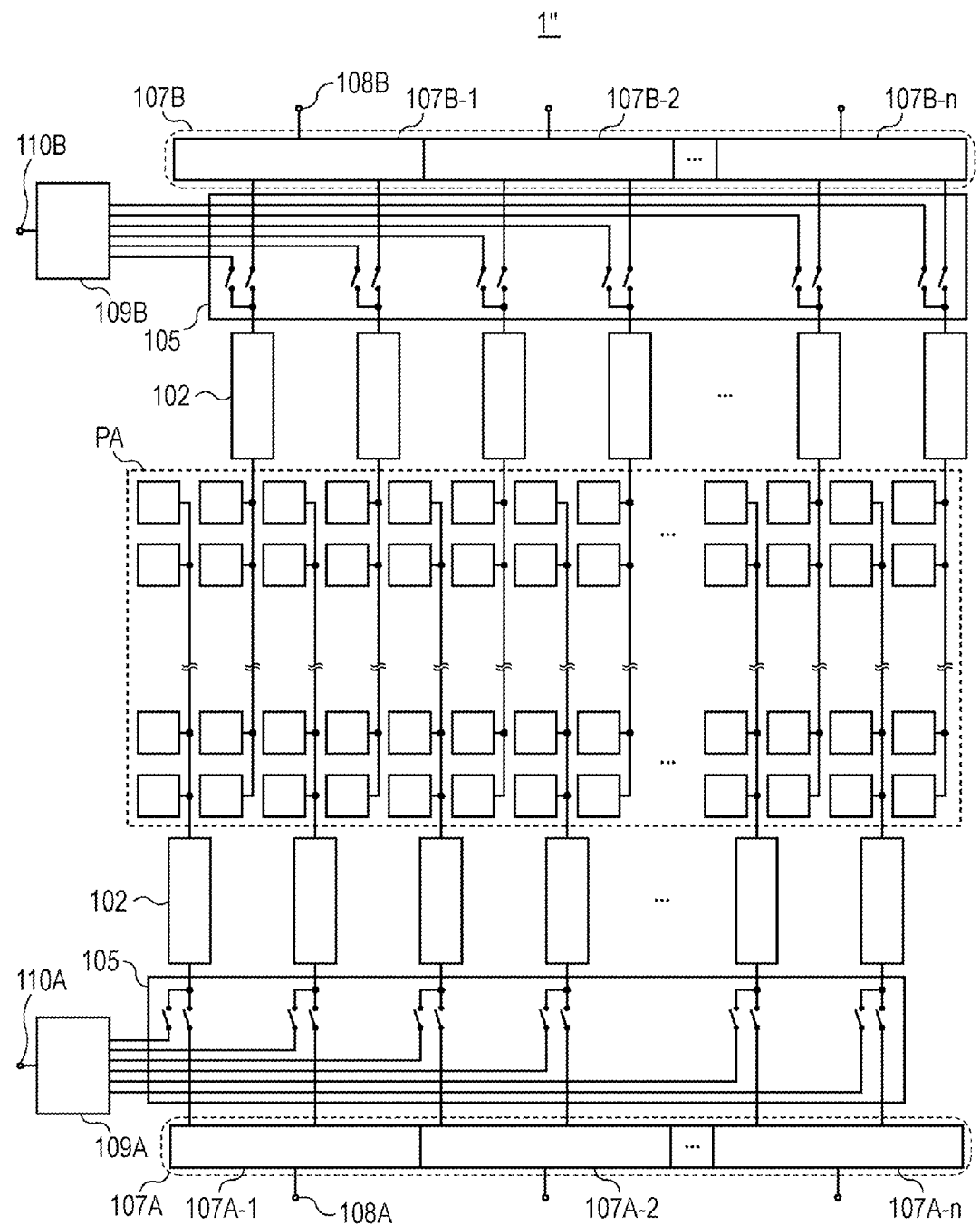
FIG. 12 is a block diagram illustrating an exemplary configuration of a photoelectric conversion apparatus according to an eighth embodiment.

FIG. 12 is a block diagram illustrating the configuration of a photoelectric conversion apparatus 1" according to this embodiment. The photoelectric conversion apparatus 1" is different from the photoelectric conversion apparatus 1 illustrated in FIG. 1 in that not signal processing units 102 in adjacent columns but two signal processing units 102 in every other column are arranged as a block. Although a drive signal generating unit, a synchronizing signal generating unit, and a synchronizing code adding unit are not illustrated in FIG. 12 in order to simplify the diagram, in this embodiment, too, a synchronizing code is added as in the above-described embodiments.

Signal processing units 102, output selection units 105, first output units 107A and 107B, and second output units 109A and 109B are provided, with the pixel array PA therebetween. In the pixel array PA, signals transmitted from pixels in odd columns from the left are output from output units illustrated in the lower part of FIG. 12, and signals transmitted from pixels in even columns from the left are output from output units illustrated in the upper part of FIG. 12.

To generalize the discussion, a plurality (four in FIG. 12) of columns that are adjacent to one another are arranged as a block and each block is divided into a plurality (two in FIG. 12) of sub-blocks (for example, sub-blocks 107A-1 and 107B-1, sub-blocks 107A-2 and 107B-2, or the like in FIG. 12). Each sub-block corresponds to a plurality of pixels in every other column in the pixel array PA. Because first output terminals 108A and 108B and second output terminals 110A and 110B are provided for each sub-block, signals can be read at higher speed than when each block is not divided into sub-blocks.

An advantage of such a configuration in which a plurality of signal processing units 102 in every other column are selected and arranged as a sub-block is that processes performed by the processing circuit, which is not illustrated, provided in the subsequent stage of the first output units 107A and 107B and the second output units 109B and 109B are simpler because, when color filters arranged in a Bayer pattern is provided, only signals of R and G or G and B are output from sub-blocks on either side.

Ninth Embodiment

Figure 13:
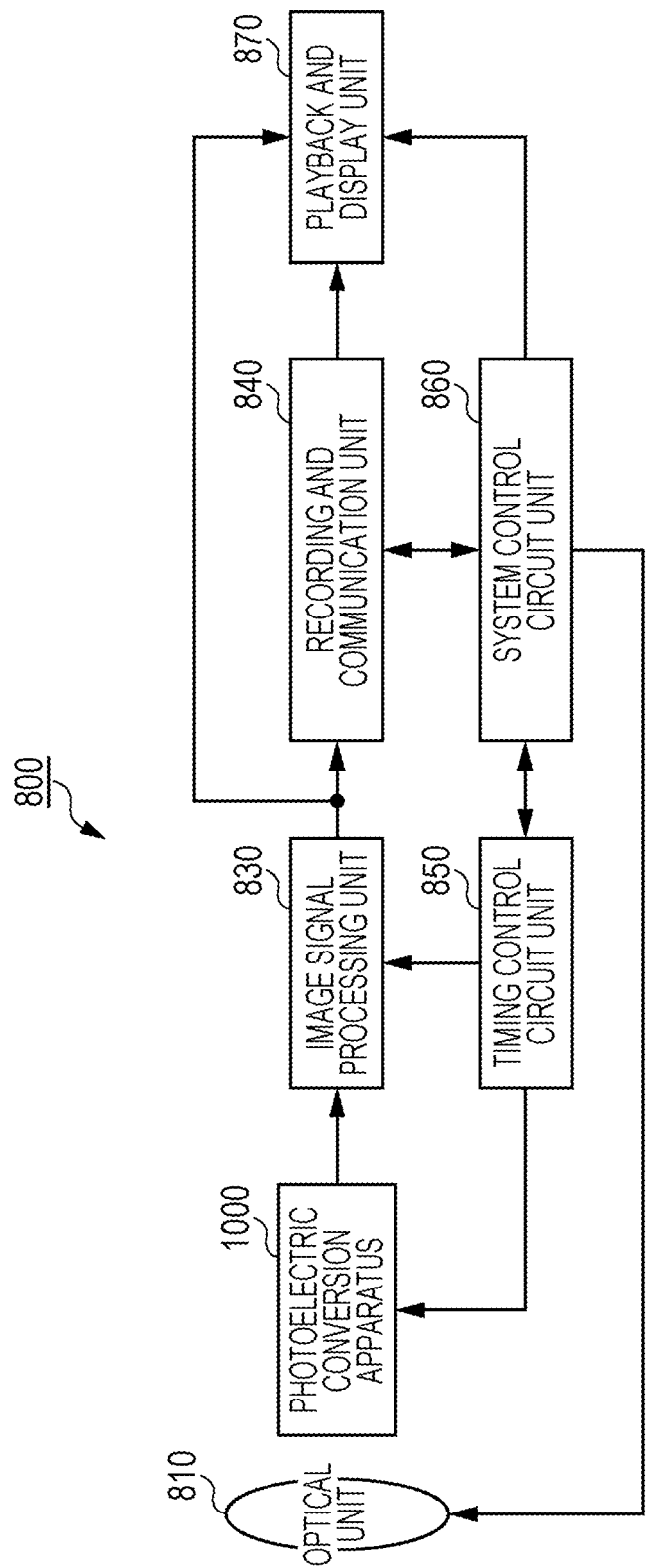
FIG. 13 is a block diagram illustrating an exemplary configuration of an image pickup system according to a ninth embodiment.

Next, the outline of an image pickup system according to this embodiment will be described with reference to FIG. 13.

An image pickup system 800 includes, for example, an optical unit 810, a photoelectric conversion apparatus 1000, an image signal processing unit 830, a recording and communication unit 840, a timing control circuit unit 850, a system control circuit unit 860, and a playing and displaying unit 870. As the photoelectric conversion apparatus 1000, the photoelectric conversion apparatus described in the above embodiments is used.

The optical unit 810, which is an optical system such as a lens, focuses light from an object upon a pixel array of the photoelectric conversion apparatus 1000 in which a plurality of pixels are arranged in a two-dimensional manner in order to form an image of the object. The photoelectric conversion apparatus 1000 outputs signals corresponding to light focused upon the pixel portion at a timing based on a signal transmitted from the timing control circuit unit 850.

The signals output from the photoelectric conversion apparatus 1000 are input to the image signal processing unit 830 as a processing circuit. The image signal processing unit 830 then performs processes such as rearrangement of the order of the signals in accordance with a method defined by a program or the like. Signals obtained as a result of the processes performed by the image signal processing unit 830 are transmitted to the recording and communication unit 840 as image data. The recording and communication unit 840 transmits signals to form an image to the playing and displaying unit 870 to cause the playing and displaying unit 870 to playback or display a movie or a still image. The playing and displaying unit 870 also receives signals from the image signal processing unit 830 and communicates with the system control circuit unit 860, as well as performing an operation for recording signals for forming an image on a recording medium, which is not illustrated.

The system control circuit unit 860 controls the entire operation of the image pickup system 800 and also controls the optical unit 810, the timing control circuit unit 850, the recording and communication unit 840, and the playing and displaying unit 870 to drive these components. In addition, the system control circuit unit 860 has, for example, a storage device as a recording medium, which is not illustrated, and records programs and the like necessary to control the operation of the image pickup system 800 on the storage device. In addition, in the image pickup system 800, the system control circuit unit 860 supplies, for example, a signal for switching the drive mode in accordance with the operation of a user. Specific examples include a change of rows to be read or to be reset, a change of the angle of view in accordance with electronic zoom, and shifting of the angle of view for electronic image stabilization.

The timing control circuit unit 850 control the drive timing of the photoelectric conversion apparatus 1000 and the image signal processing unit 830 on the basis of the control performed by the system control circuit unit 860, which is a control unit.

The embodiments described above are exemplary embodiments for implementing the present invention and may be modified or combined with one another in various ways, insofar as the technical idea of the present invention is not deviated from.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191318 filed Aug. 27, 2010, which is hereby incorporated by reference herein in its entirety.

What is claimed is:

1. A photoelectric conversion apparatus comprising:
    a pixel array in which a plurality of pixels is arranged in rows and columns;
    signal processing units that are provided in correspondence with the columns of the pixel array, the signal processing units including a plurality of analog-to-digital converters that converts signals output from the plurality of pixels into digital signals;
    an output unit having two or more output terminals and including a plurality of output blocks provided in correspondence with the output terminals; and
    a synchronizing signal generating unit for outputting a synchronizing signal,
    wherein signal processing units in a plurality of columns are arranged as a block,
    wherein the plurality of output blocks outputs signals output from a plurality of signal processing units that belongs to the same block, and
    wherein the photoelectric conversion apparatus further comprises a synchronizing code adding unit for adding a synchronizing code to the signals output from each of the plurality of output blocks, in synchronization with the synchronizing signal,
    wherein the synchronizing code includes information regarding a position of the output block.

2. The photoelectric conversion apparatus according to claim 1,
    wherein the synchronizing signal generating unit includes a phase-locked loop circuit and uses a signal output from the phase-locked loop circuit as the synchronizing signal.

3. The photoelectric conversion apparatus according to claim 1,
    wherein the synchronizing code adding unit adds the synchronizing code in correspondence with each of the rows of the pixel array.

4. The photoelectric conversion apparatus according to claim 1,
    wherein the signal processing units output the digital signals as parallel data, and
    wherein the plurality of output blocks converts the parallel data into serial data and outputs the serial data from the output terminals.

5. The photoelectric conversion apparatus according to claim 1,
    wherein the signal processing units have noise reduction circuits for reducing noise in the signals output from the plurality of pixels and for transmitting the signals to the plurality of analog-to-digital converters.

6. The photoelectric conversion apparatus according to claim 1,
    wherein the signal processing units have memory units for storing the digital signals.

7. An image pickup system comprising:
    the photoelectric conversion apparatus according to claim 1;
    an optical system for forming an image onto a pixel portion of the photoelectric conversion apparatus; and
    an image signal processing unit for generating image data by processing signals output from the photoelectric conversion apparatus.

8. The photoelectric conversion apparatus according to claim 1,
    wherein signal processing units in a plurality of columns that is adjacent to one another are arranged as the block.

9. The photoelectric conversion apparatus according to claim 1,
    wherein a plurality of signal processing units in every other column is arranged as the block.

10. The photoelectric conversion apparatus according to claim 1,
    wherein the synchronizing code includes information regarding a number of bits of the digital signal.

11. The photoelectric conversion apparatus according to claim 1, further comprising a plurality of synchronizing code adding units and a plurality of synchronizing signal generating units,
    wherein each of the plurality of synchronizing code adding units and each of the plurality of synchronizing signal generating units are provided in correspondence with each of the plurality of output blocks.

* * * * *